(12) United States Patent
Fujii et al.

(10) Patent No.: US 12,097,564 B2
(45) Date of Patent: Sep. 24, 2024

(54) BALL END MILL AND CUTTING INSERT

(71) Applicant: OSG CORPORATION, Toyokawa (JP)

(72) Inventors: Yasuhito Fujii, Toyokawa (JP);
Yasuyuki Endoh, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 753 days.

(21) Appl. No.: 17/277,025

(22) PCT Filed: Jun. 3, 2019

(86) PCT No.: PCT/JP2019/021992
§ 371 (c)(1),
(2) Date: Mar. 17, 2021

(87) PCT Pub. No.: WO2020/245878
PCT Pub. Date: Dec. 10, 2020

(65) Prior Publication Data
US 2022/0032381 A1 Feb. 3, 2022

(51) Int. Cl.
*B23C 5/10* (2006.01)
(52) U.S. Cl.
CPC .......... *B23C 5/1027* (2013.01); *B23C 5/1009* (2013.01); *B23C 2200/203* (2013.01); *B23C 2210/084* (2013.01)
(58) Field of Classification Search
CPC ............ B23C 5/1027; B23C 2200/203; B23C 2210/084; B23C 2220/28; B23C 5/1036; B23C 5/1009; B23C 2220/64
See application file for complete search history.

(56) References Cited

U.S. PATENT DOCUMENTS

| 4,252,480 A | 2/1981 | Mizuno et al. |
| 4,898,500 A | 2/1990 | Nakamura et al. |
| 6,684,742 B1 | 2/2004 | White |

FOREIGN PATENT DOCUMENTS

| DE | 4405987 A1 * | 9/1994 | ........... B23C 5/1009 |
| EP | 1228831 A1 * | 8/2002 | ........... B23C 5/1036 |

(Continued)

OTHER PUBLICATIONS

Extended (Supplementary) European Search Report dated Nov. 9, 2022, issued in counterpart EP Application No. 19931519.3. (7 pages).

(Continued)

*Primary Examiner* — Sara Addisu
(74) *Attorney, Agent, or Firm* — WHDA, LLP

(57) ABSTRACT

Large diameter edges formed in arc shapes having curvature radii larger than a ball radius are provided. This allows improving surface roughness of a machined surface by cutting of a planar surface with the respective large diameter edges compared with cutting of a planar surface with a ball end cutting edge formed in an arc shape having a single curvature radius. Further, since the respective large diameter edges are formed in the arc shape, compared with cutting of a curved surface with linear cutting edges, surface roughness of a machined surface can be improved by cutting a curved surface with the respective large diameter edges. Accordingly, a pick feed during the cutting of the planar surface and the curved surface with the respective large diameter edges can be increased, and therefore machining efficiency in the cutting of both of the planar surface and the curved surface can be improved.

4 Claims, 7 Drawing Sheets

Fig.2 (a)

(56) References Cited

FOREIGN PATENT DOCUMENTS

| | | | | |
|---|---|---|---|---|
| JP | H02-232112 | A | 9/1990 | |
| JP | 7-132407 | A | 5/1995 | |
| JP | 08-118133 | A | 5/1996 | |
| JP | 2002-126935 | A | 5/2002 | |
| JP | 2003019618 | A * | 1/2003 | ........... B23C 5/1036 |
| JP | 2003019619 | A * | 1/2003 | ........... B23C 5/1045 |
| JP | 2004-090171 | A | 3/2004 | |
| JP | 3703859 | B2 * | 10/2005 | ........... B23C 5/1027 |
| JP | 2016-179543 | A | 10/2016 | |

OTHER PUBLICATIONS

Notification of Transmittal of Translation of the International Preliminary Report on Patentability (Form PCT/IB/338) issued in counterpart International Application No. PCT/JP2019/021992 mailed Dec. 9, 2021 with Form PCT/IPEA/409. (4 pages).

International Search Report dated Jul. 30, 2019, issued in counterpart application No. PCT/JP2019/021992, w/English translation (5 pages).

Written Opinion dated Jul. 30, 2019, issued in counterpart application No. PCT/JP2019/021992 (6 pages).

* cited by examiner

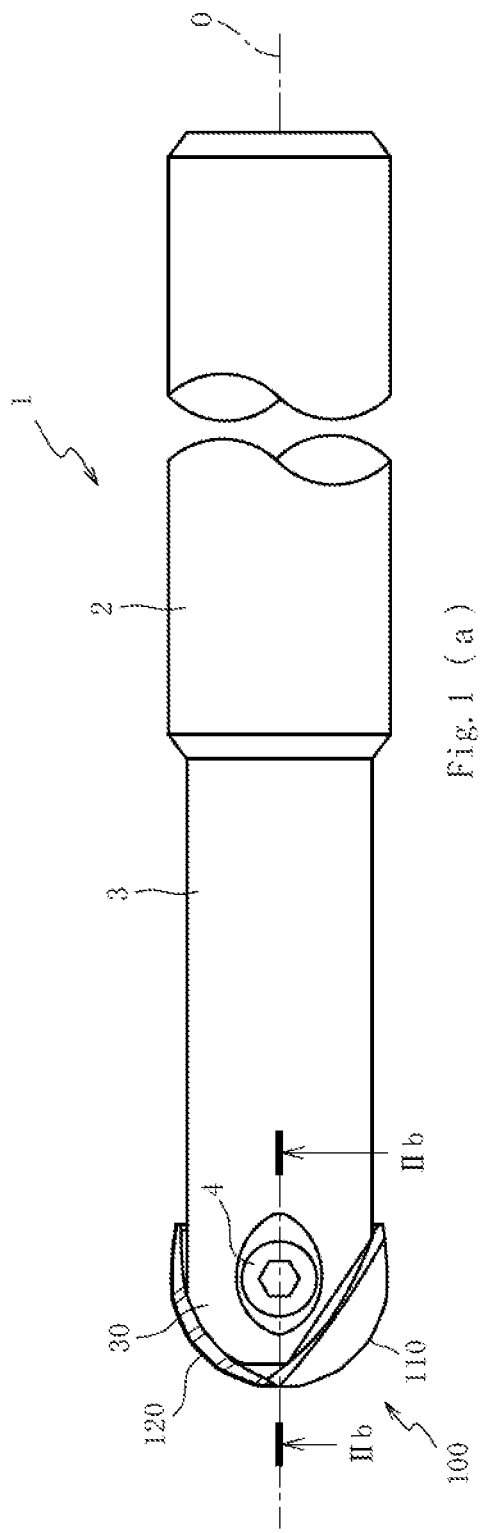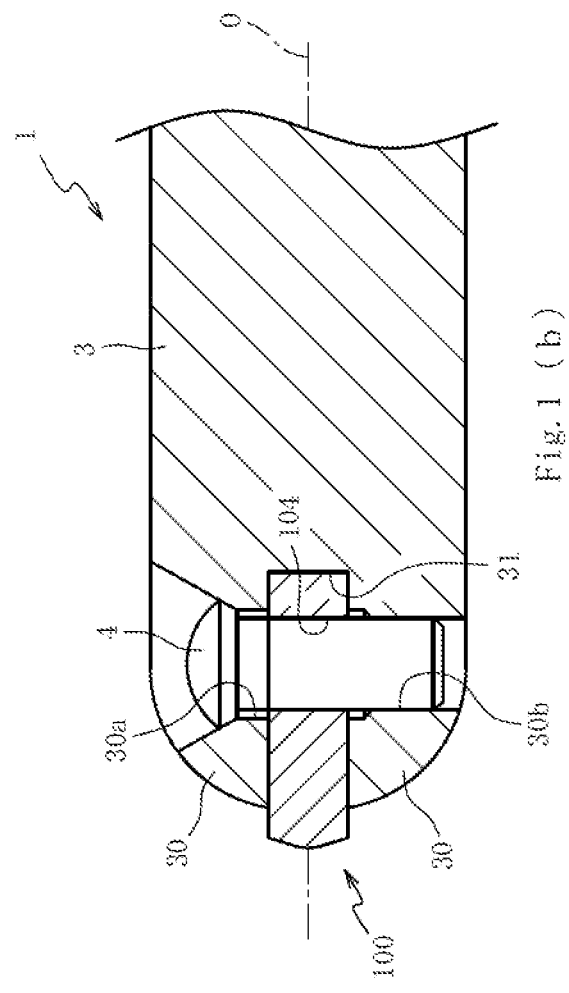

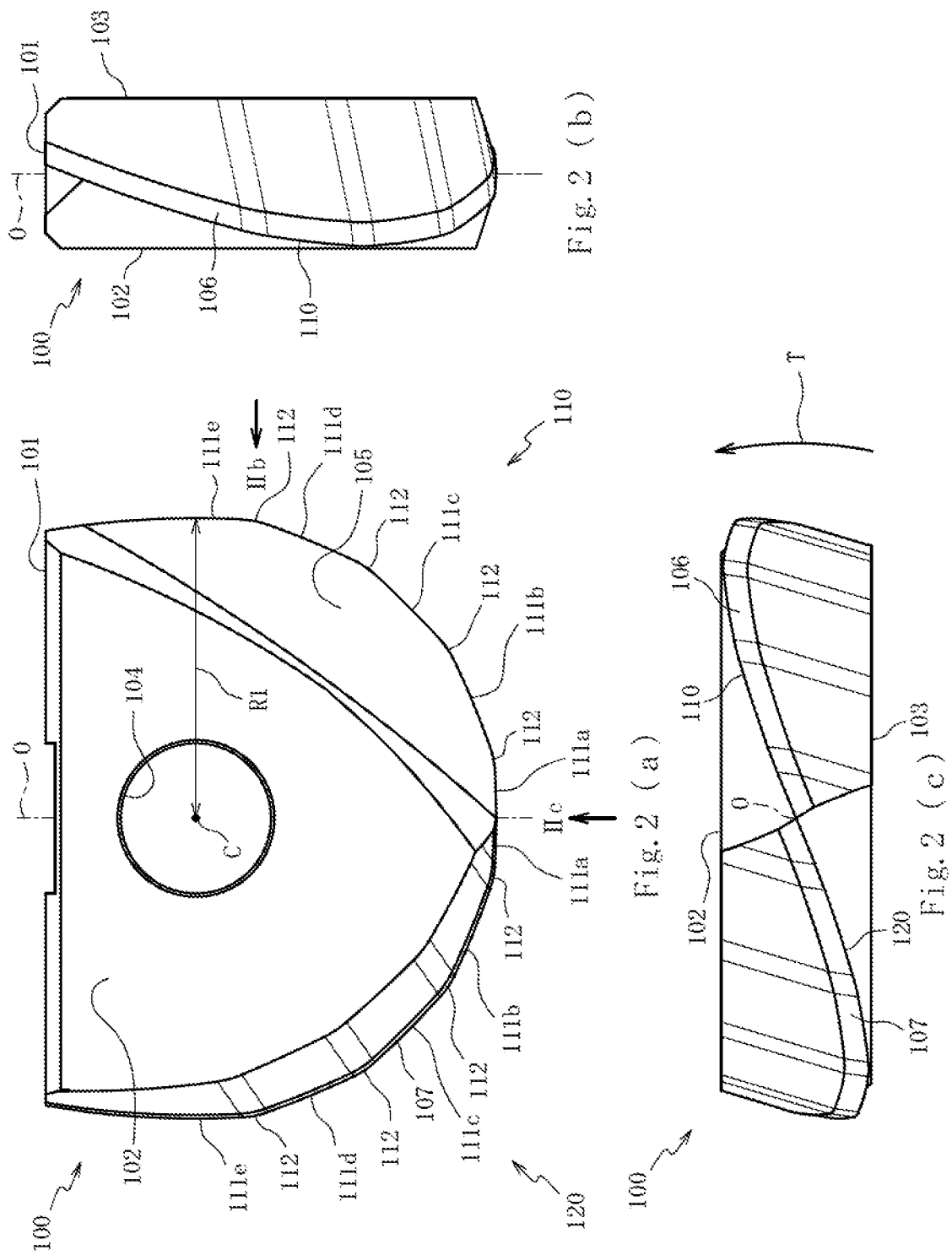

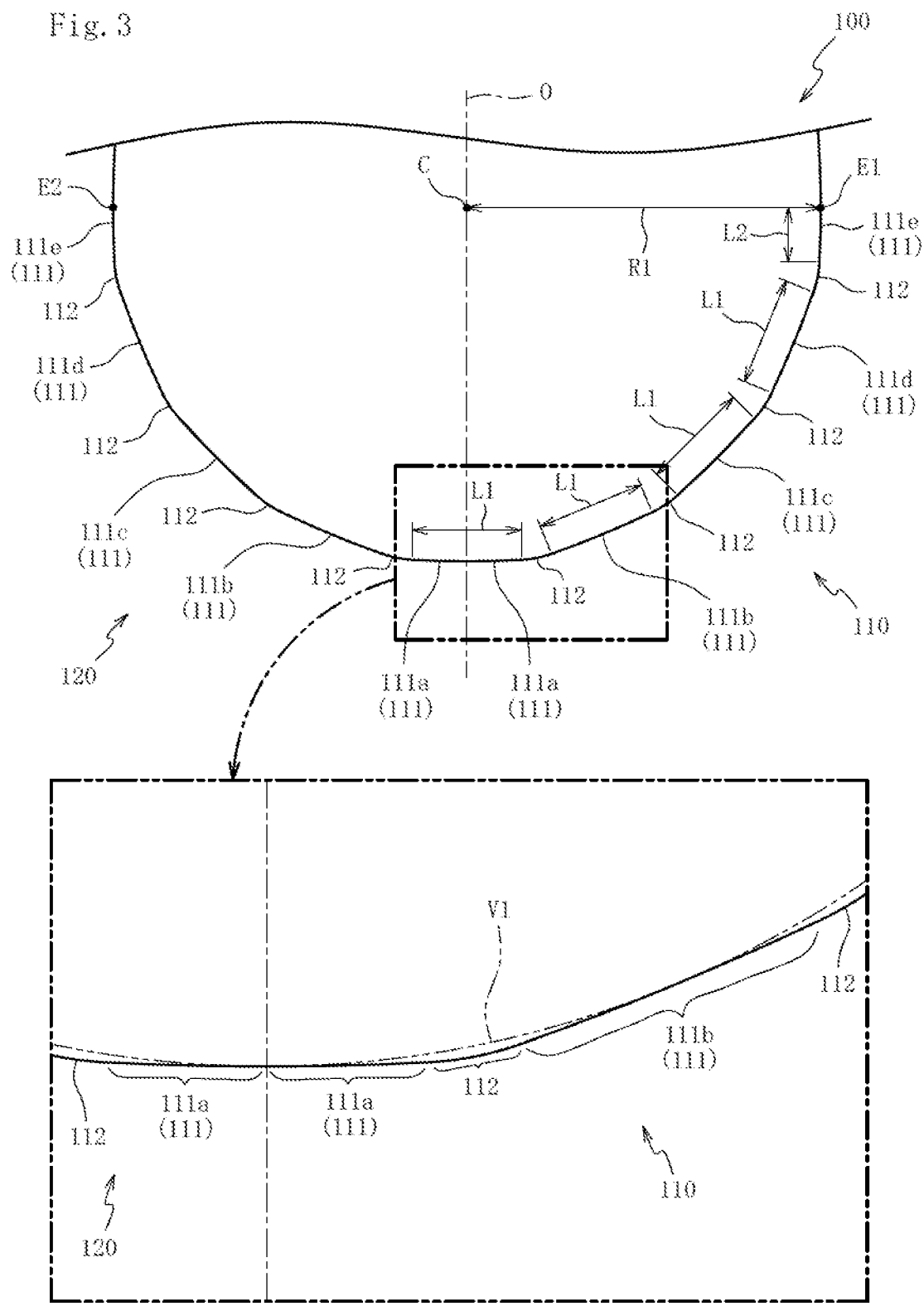

BALL END MILL AND CUTTING INSERT

TECHNICAL FIELD

The present invention relates to a ball end mill and a cutting insert and especially relates to a ball end mill and a cutting insert that can improve machining efficiency in cutting of both of a planar surface and a curved surface.

BACKGROUND ART

There has been known a ball end mill that includes a hemispherical ball end cutting edge. In cutting (finish machining) of a planar surface with the ball end cutting edge formed in an arc shape having a single curvature radius, to improve surface roughness of the machined surface, a pick feed (a pitch for machining) needs to be decreased. This causes a problem that machining efficiency is decreased.

Against this problem, Patent Literature 1 discloses a technique that provides a plurality of linear cutting edges in a ball end cutting edge (cutting edge). When a planar surface is cut at an identical pick feed, this technique allows improving surface roughness of the machined surface by the cutting with the linear cutting edges, compared with cutting with the ball end cutting edge formed in the arc shape having the single curvature radius. That is, the cutting of the planar surface with the linear cutting edges allows obtaining the surface roughness similar to the case of the cutting with the arc-shaped ball end cutting edge even when the pick feed is increased, thereby ensuring improving machining efficiency.

CITATION LIST

Patent Literature

Patent Literature 1: Japanese Unexamined Patent Application Publication No. 07-132407 (for example, paragraphs 0019 and 0026 to 0028, FIGS. 2 and 3)

SUMMARY OF INVENTION

Technical Problem

However, in the above-described conventional technique, when a curved surface is cut with the linear cutting edges, surface roughness is likely to be decreased. Accordingly, this has a problem that improvement in machining efficiency of cutting of both of a planar surface and a curved surface is difficult.

The present invention has been made to solve the above-described problems, and an object of the present invention is to provide a ball end mill and a cutting insert that allow improving machining efficiency in cutting of both of a planar surface and a curved surface.

Solution to Problem

In order to achieve the object, a ball end mill and a cutting insert of the present invention include a ball end cutting edge. The ball end cutting edge is on a distal end in an axis line direction. A rotation locus of the ball end cutting edge around the axis line is formed in an approximately hemispherical shape. The ball end cutting edge includes a large diameter edge. The large diameter edge is formed in an arc shape having a curvature radius larger than a ball radius of the ball end cutting edge. A plurality of the large diameter edges are formed in a region 80% or more to 120% or less of the ball radius from a center of the ball end cutting edge from a distal end to an outer peripheral end of the ball end cutting edge.

Advantageous Effects of Invention

With the ball end mill according to an eleventh aspect and the cutting insert according to eighteenth to twenty fourth aspects, since the ball end cutting edge includes the large diameter edges formed in the arc shape having the curvature radius larger than the ball radius of the ball end cutting edge, compared with cutting of a planar surface with a ball end cutting edge formed in an arc shape having a single curvature radius, surface roughness of a machined surface can be improved by cutting of a planar surface with the large diameter edges. Further, since the large diameter edges are formed in the arc shape, compared with cutting of a curved surface with linear cutting edges, surface roughness of the machined surface can be improved by cutting a curved surface with the large diameter edges.

Since a pick feed during the cutting of the respective planar surface and curved surface with the large diameter edges can be increased, this brings an effect that machining efficiency in the cutting of both of the planar surface and the curved surface can be improved.

Additionally, the plurality of large diameter edges are formed in the region 80% or more to 120% or less of the ball radius from the center of the ball end cutting edge from the distal end to the outer peripheral end of the ball end cutting edge. Accordingly, even when the curvature radius of the large diameter edge is larger than the ball radius, an edge shape (contour shape) of the ball end cutting edge formed by the large diameter edges can be a shape close to an arc. This brings an effect of ensuring suppressing a decrease in machining efficiency when a curved surface having a curvature radius smaller than that of the large diameter edge is simultaneously cut with the plurality of large diameter edges.

The With the ball end mill according to the eleventh aspect and the cutting insert according to the eighteenth to twenty fourth aspects, the plurality of large diameter edges each have an identical cutting width in a predetermined region from the distal end to the outer peripheral end side of the ball end cutting edge. Accordingly, when cutting is performed by three-axis machining (a relative angle of the ball end mill with respect to a cut object is unchanged), surface roughness when machined surfaces (a planar surface and a curved surface) having different angles are cut with the respective large diameter edges can be easily uniformed. This brings an effect that the machining efficiency in the planar surface and the curved surface having the different angles can be improved in a balanced manner even when the cutting is performed by three-axis machining.

Note that the predetermined region is at least a "region from the large diameter edge positioned on the most distal end side to the large diameter edge adjacent to the large diameter edge positioned on the most outer peripheral end side of the ball end cutting edge" and more preferably a "region from the large diameter edge positioned on the most distal end side to the large diameter edge positioned on the most outer peripheral end side of the ball end cutting edge."

Further, with the ball end mill according to the eleventh aspect and the cutting insert according to the eighteenth to twenty fourth aspects, the plurality of large diameter edges each have the identical curvature radius. Thus, when cutting is performed by three-axis machining, the surface roughness when the machined surfaces having the different angles are cut with the respective large diameter edges can be more easily uniformed. This brings an effect that even when the cutting is performed by three-axis machining, the machining efficiency in the planar surface and the curved surface having the different angles can be improved in a more balanced manner.

Further, with the ball end mill according to the eleventh aspect and the cutting insert according to the eighteenth to twenty fourth aspects, when an imaginary circle having the ball radius is drawn with the center of the ball end cutting edge as a center, the imaginary circle internally contacts respective rotation loci of the plurality of large diameter edges. Therefore, inclinations of the respective large diameter edges with respect to the axis line can be gradually changed from the distal end to the outer peripheral end of the ball end cutting edge. This brings an effect that the machining efficiency in the planar surface and the curved surface having the different angles can be further improved in a balanced manner even in the cutting by three-axis machining.

Additionally, by gradually changing the inclinations of the respective large diameter edges with respect to the axis line from the distal end to the outer peripheral end of the ball end cutting edge, when the planar surface and the curved surface having the different angles are cut by five-axis machining, a swing angle of the ball end mill to cause the respective large diameter edges to run along the planar surface and the curved surface can be decreased as much as possible. This brings an effect that the machining efficiency in the planar surface and the curved surface having the different angles can be improved in the cutting by five-axis machining.

Further, when the imaginary circle having the ball radius is drawn with the center of the ball end cutting edge as its center, the imaginary circle internally contacts the respective rotation loci of the plurality of large diameter edges, and therefore the edge shape of the ball end cutting edge formed by the large diameter edges can be the shape close to the arc. This brings an effect of ensuring more effectively suppressing the decrease in machining efficiency when the curved surface having the curvature radius smaller than that of the large diameter edge is simultaneously cut with the plurality of large diameter edges.

The ball end mill according to a twelfth aspect provides the following effect. The large diameter edge positioned on the most distal end side of the ball end cutting edge has a curvature radius and the cutting width larger than curvature radii and the cutting widths of the other large diameter edges. This brings an effect that, for example, when a planar surface perpendicular to the axis line is cut by three-axis machining, the cutting with the large diameter edge positioned on the most distal end side of the ball end cutting edge allows especially improving surface roughness (machining efficiency) of the machined surface.

The ball end mill according to the twelfth aspect provides the following effect. The large diameter edge positioned on the most outer peripheral end side of the ball end cutting edge has a curvature radius and the cutting width larger than curvature radii and the cutting widths of the other large diameter edges. This brings an effect that, for example, when a planar surface parallel to the axis line is cut by three-axis machining, the cutting with the large diameter edge positioned on the most outer peripheral end side of the ball end cutting edge allows especially improving surface roughness (machining efficiency) of the machined surface.

The ball end mill according to the twelfth aspect provides the following effect. The large diameter edge positioned on an imaginary line passing through the center of the ball end cutting edge and having an angle of 45° with respect to the axis line has the curvature radius and the cutting width larger than the curvature radii and the cutting widths of the other large diameter edges. This brings an effect that, for example, when a machined surface inclined with respect to the axis line is cut by three-axis machining, surface roughness (machining efficiency) of the machined surface can be especially improved by cutting with the large diameter edge positioned on the imaginary line having the angle of 45° with respect to the axis line.

The ball end mill according to a thirteenth aspect provides the following effect. The large diameter edge includes a bottom large diameter edge and an outer peripheral large diameter edge. The bottom large diameter edge is positioned on the distal end side of the ball end cutting edge. The outer peripheral large diameter edge is positioned on the outer peripheral end side of the ball end cutting edge. The ball end cutting edge includes an intermediate diameter edge. The intermediate diameter edge connects between the bottom large diameter edge and the outer peripheral large diameter edge. The intermediate diameter edge is formed in an arc shape having a curvature radius identical to the ball radius of the ball end cutting edge and the intermediate diameter edge is positioned on an imaginary line passing through the center of the ball end cutting edge and having an angle of 45° with respect to the axis line.

This brings an effect that, by cutting a curved surface or a planar surface having a curvature radius larger than that of the intermediate diameter edge with the bottom large diameter edge and the outer peripheral large diameter edge and cutting a curved surface having a curvature radius identical to the ball radius with the intermediate diameter edge, surface roughness (machining efficiency) of the machined surfaces can be improved during cutting of curved surfaces having various curvature radii.

The ball end mill according to fourteenth and fifteenth aspects provides the following effect, in addition to the effect provided by the ball end mill according to the eleventh and twelfth aspects. Five or more of the large diameter edges are formed from the distal end to the outer peripheral end of the ball end cutting edge. Accordingly, compared with a case of the number of large diameter edges of less than five, the planar surface and the curved surfaces having various angles can be cut with the respective large diameter edges in the cutting by three-axis machining. This brings an effect that the machining efficiency of the planar surface and the curved surface having the different angles can be improved in a more balanced manner even in the cutting by three-axis machining.

Additionally, since 16 or less of the large diameter edges are formed from the distal end to the outer peripheral end of the ball end cutting edge, compared with a case of the number of the large diameter edges in excess of 16, the cutting width of each large diameter edge can be widely ensured. This allows increasing the pick feed during the cutting with the respective large diameter edges, and therefore this brings an effect that the machining efficiency with the respective large diameter edges can be improved.

The ball end mill according to sixteenth and seventeenth aspects provides the following effect, in addition to the effects provided by the ball end mill according to the eleventh and twelfth aspects. The ball end cutting edge includes a plurality of small diameter edges. The plurality of small diameter edges connect between the large diameter edges and have arc shapes having curvature radii smaller than the ball radius. Thus, the plurality of small diameter edges can smoothly connect between the respective large diameter edges. This brings an effect that, in simultaneous cutting with the plurality of large diameter edges, chipping in connecting parts of the respective large diameter edges can be suppressed.

BRIEF DESCRIPTION OF DRAWINGS

FIG. 1(a) is a front view of a ball end mill according to one embodiment of the present invention, and FIG. 1(b) is a partially enlarged cross-sectional view of the ball end mill along the line IIb-IIb in FIG. 1(a).

FIG. 2(a) is a front view of a cutting insert, FIG. 2(b) is a side view of the cutting insert in a view of the arrow IIb direction in FIG. 2(a), and FIG. 2(c) is a bottom view of the cutting insert in a view of the arrow IIc direction in FIG. 2(a).

FIG. 3 is a schematic diagram schematically illustrating edge shapes of a first ball end cutting edge and a second ball end cutting edge of the cutting insert.

DESCRIPTION OF EMBODIMENTS

Figure 4:
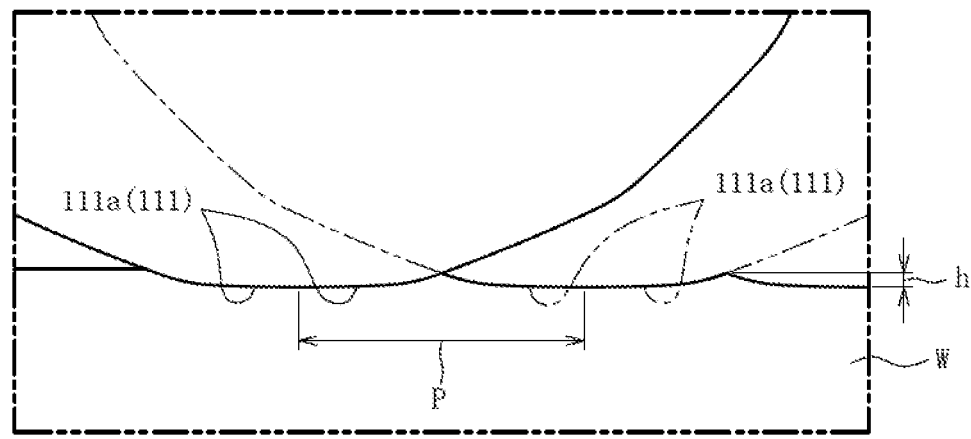
FIG. 4(a) is a schematic diagram illustrating a state of cutting a workpiece with a ball end mill of the present invention.
FIG. 4(b) is a schematic diagram illustrating a state of cutting the workpiece with a ball end mill with a single R.
Figure 4:
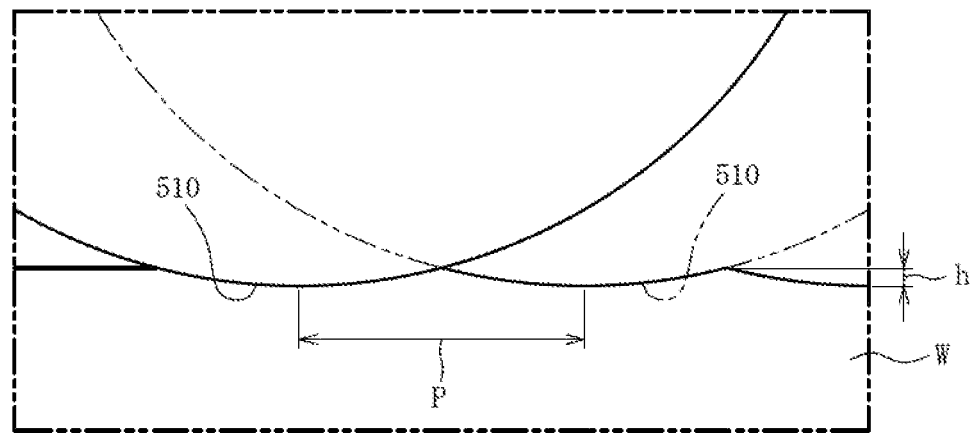

Preferred embodiments of the present invention will be described below referring to the accompanying drawings. First, with reference to FIG. 1, a configuration of a ball end mill 1 will be described. FIG. 1(a) is a front view of the ball end mill 1 according to one embodiment of the present invention, and FIG. 2(b) is a partially enlarged cross-sectional view of the ball end mill 1 along the line IIb-IIb in FIG. 1(a).

As illustrated in FIG. 1, the ball end mill 1 includes a shank portion 2 constituting a portion on its base end side and a body portion 3 connected to the distal end of the shank portion 2. The ball end mill 1 is configured as a cutting-edge replaceable ball end mill in which a cutting insert 100 is removably secured to the distal end of the body portion 3.

The shank portion 2 and the body portion 3 are each formed in a columnar shape around an axis line O. The shank portion 2 is mounted to a spindle of a machine tool, and a rotation of the shank portion 2 around the axis line O performs a cutting work of a work material.

A pair of securing portions 30 are formed on the distal end side of the body portion 3 with a predetermined interval in a direction perpendicular to the axis line O (the up-down direction of FIG. 1(b)). Between the pair of securing portions 30, a depressed portion 31 having a rectangular cross-sectional surface depressed toward the base end side (the right side of FIG. 1(b)) of the body portion 3 is formed, and the cutting insert 100 is insertable to the depressed portion 31.

A through-hole 30a is formed in one (the upper side of FIG. 1(b)) securing portion 30 among the pair of securing portions 30, and an internal thread hole 30b is formed at a position corresponding to the through-hole 30a in the other (the lower side of FIG. 1(b)) securing portion 30. With the cutting insert 100 inserted into the depressed portion 31, fastening a screw 4 inserted into the through-hole 30a in the securing portion 30 and a mounting hole 104 in the cutting insert 100 to the internal thread hole 30b secures the cutting insert 100 to the securing portions 30 (depressed portion 31).

The distal end sides of the pair of securing portions 30 are formed in an approximately hemispherical shape. With the cutting insert 100 secured to the securing portions 30, a first ball end cutting edge 110 and a second ball end cutting edge 120 of the cutting insert 100 are exposed to the peripheral areas of the securing portions 30 in front view.

Next, with reference to FIG. 2, a configuration of the cutting insert 100 will be described. FIG. 2(a) is a front view of the cutting insert 100, FIG. 2(b) is a side view of the cutting insert 100 in a view of the arrow IIb direction in FIG. 2(a), and FIG. 2(c) is a bottom view of the cutting insert 100 in a view of the arrow IIc direction in FIG. 2(a).

In the following description, in a case of describing the cutting insert 100 alone as well, respective portions of the cutting insert 100 will be described based on a state in which the respective portions are mounted to the ball end mill 1 (see FIG. 1). Accordingly, in the state where the cutting insert 100 is mounted to the ball end mill 1 (the state of FIG. 1), the description will be given with a portion constituting the distal end side of the ball end mill 1 defined as the distal end of the cutting insert 100, a portion on a side opposite to the distal end defined as the base end of the cutting insert 100, and a portion constituting the outer peripheral end side of the ball end mill 1 defined as the outer peripheral end of the cutting insert 100. Additionally, the description will be given with a thickness direction (a direction perpendicular to the paper of FIG. 2(a)) of the cutting insert 100 simply described as a "thickness direction."

As illustrated in FIG. 2, the cutting insert 100 is formed in an approximately flat plate shape using a hard material, such as cemented carbide, and has a shape symmetrical front and back having the identical shape when rotated by 180° with respect to the axis line O. The cutting insert 100 has a shape in which a part of the base end side (the upper side of FIG. 2(a)) of the circle is cut out in the thickness direction view (see FIG. 2(a)), and the distal end side of the cutting insert 100 is formed in an approximately semicircular shape in the thickness direction view.

Here, the surface on the base end side of the cutting insert 100 and the surface perpendicular to the axis line O is defined as a base end surface 101, and surfaces facing the thickness direction (the direction perpendicular to the axis line O) of the cutting insert 100 are defined as a pair of side surfaces 102, 103.

The mounting hole 104 having a circular cross-sectional surface is formed so as to penetrate the pair of side surfaces 102, 103, and this mounting hole 104 is formed at a position approximately matching a center C (see FIG. 2(a)) of ball end cutting edge described later. A pair of faces 105 are formed from the distal end (the end portion on the lower side of FIG. 2(a)) of the cutting insert 100 to the outer peripheral end sides (the end portions in the right-left direction of FIG.

2(a)) of the base end surface 101 on the outer peripheral edge portion of the cutting insert 100 so as to be depressed from the pair of side surfaces 102, 103 in the thickness direction. Note that among the pair of faces 105, the illustration of the face 105 of the second ball end cutting edge 120 is omitted.

The pair of faces 105 are surfaces facing the front side in a rotation direction T (an anticlockwise direction in FIG. 2(c)) of the cutting insert 100 in the state to which the ball end mill 1 (see FIG. 1) is mounted. A pair of flanks 106, 107 are formed on the rear side in the rotation direction T of the pair of faces 105 so as to be continuous with the faces 105, and the first ball end cutting edge 110 and the second ball end cutting edge 120 are formed at intersecting ridgeline portions between the flanks 106, 107 and the faces 105.

The first ball end cutting edge 110 and the second ball end cutting edge 120 are formed in a protruding curve shape to the front side in the rotation direction T (see FIG. 2(b)), and an approximately S-shaped ball end cutting edge is formed by the first ball end cutting edge 110 and the second ball end cutting edge 120 in the distal end view (see FIG. 2(c)) of the cutting insert 100.

The first ball end cutting edge 110 and the second ball end cutting edge 120 are cutting edges formed in an approximately semicircular shape protruding to the distal end of the cutting insert 100 in the thickness direction view. Since the first ball end cutting edge 110 and the second ball end cutting edge 120 have substantially identical configurations, the description will be given with reference numerals identical to those of the first ball end cutting edge 110 assigned to the second ball end cutting edge 120.

The first ball end cutting edge 110 and the second ball end cutting edge 120 include a plurality of (five in this embodiment) large diameter edges 111a to 111e and a plurality of (four in this embodiment) small diameter edges 112. The large diameter edges 111a to 111e are formed in an arc shape protruding in a direction away from the center C (the center on the axis line O) of the first ball end cutting edge 110 and the second ball end cutting edge 120. The small diameter edges 112 connect between the plurality of large diameter edges 111a to 111e and are formed in an arc shape protruding in the direction away from the center C.

In the following description, among the plurality of large diameter edges 111a to 111e, the one positioned on the most distal end side is defined as the bottom large diameter edge 111a, the one positioned on the most outer peripheral end side is defined as the outer peripheral large diameter edge 111e, and ones positioned between the bottom large diameter edge 111a and the outer peripheral large diameter edge 111e are defined as the inclined large diameter edges 111b to 111d for description. However, when the bottom large diameter edge 111a, the inclined large diameter edges 111b to 111d, and the outer peripheral large diameter edge 111e are collectively described, they will be abbreviated as "each large diameter edge 111."

Next, with reference to FIG. 3, detailed configurations of the first ball end cutting edge 110 and the second ball end cutting edge 120 will be described. FIG. 3 is a schematic diagram schematically illustrating edge shapes of the first ball end cutting edge 110 and the second ball end cutting edge 120 of the cutting insert 100. That is, FIG. 3 is a diagram projecting the edge shapes (contour shapes) of the first ball end cutting edge 110 and the second ball end cutting edge 120 in the thickness direction and illustrates rotation loci of the first ball end cutting edge 110 and the second ball end cutting edge 120.

As illustrated in FIG. 3, each large diameter edge 111 is formed in an arc shape having a curvature radius (30 mm in this embodiment) larger than a ball radius R1 (10 mm in this embodiment) of the first ball end cutting edge 110 and the second ball end cutting edge 120. Each small diameter edge 112 is formed in an arc shape having a curvature radius (3 mm in this embodiment) smaller than the ball radius R1.

Note that, the ball radius R1 is a length of a line segment perpendicularly extending from the axis line O to an outer peripheral end E1 of the first ball end cutting edge 110 (an outer peripheral end E2 of the second ball end cutting edge 120), and an intersection point between the line segment and the axis line O becomes the center C of the first ball end cutting edge 110 and the second ball end cutting edge 120.

Each large diameter edge 111 and each small diameter edge 112 are formed in a region 105% or less of the ball radius R1 from the center C of the first ball end cutting edge 110 (the second ball end cutting edge 120). Accordingly, even when the curvature radius of each large diameter edge 111 is larger than the ball radius R1, the edge shape of the first ball end cutting edge 110 (the second ball end cutting edge 120), that is, the rotation locus of each large diameter edge 111 and each small diameter edge 112 can be formed in a shape close to an arc.

A length of cut of the bottom large diameter edge 111a has a length identical to a length of cut of the outer peripheral large diameter edge 111e (a length of cut up to the outer peripheral end E1), and a length of cut of each of the inclined large diameter edges 111b to 111d is a length twice the length of cut of the bottom large diameter edge 111a. That is, defining the distal end of the first ball end cutting edge 110 (the second ball end cutting edge 120) as a cutting position at 0° and the outer peripheral end E1 of the first ball end cutting edge 110 (the outer peripheral end E2 of the second ball end cutting edge 120) as a cutting position at 90°, equally dividing the lengths of cut of the first ball end cutting edge 110 and the second ball end cutting edge 120 in the cutting region from 0° to 90° forms each large diameter edge 111.

Accordingly, in the cutting region from 0° to 90°, a cutting width L1 (3 mm in this embodiment) by the two bottom large diameter edges 111a of the first ball end cutting edge 110 and the second ball end cutting edge 120 has a length identical to the cutting width L1 by each of the inclined large diameter edges 111b to 111d.

Additionally, when the cutting position from 0° to 90° is defined as the cutting region of the first ball end cutting edge 110 (the second ball end cutting edge 120), while a cutting width L2 by the outer peripheral large diameter edge 111e is one half of the cutting width L1 by the two bottom large diameter edges 111a, the outer peripheral large diameter edge 111e extends to the base end side of the cutting insert 100 exceeding the cutting position at 90°. That is, the outer peripheral large diameter edge 111e also allows cutting at the cutting width equal to the cutting width L1 by the two bottom large diameter edges 111a, and the cutting widths by each large diameter edge 111 have substantially the identical lengths.

In the thickness direction view, when an imaginary circle V1 (see the enlarged part in FIG. 3) having the ball radius R1 with the center C of the first ball end cutting edge 110 and the second ball end cutting edge 120 as its center is drawn, the imaginary circle V1 internally contacts each large diameter edge 111 (the rotation loci of each large diameter edge 111 contacts the imaginary circle V1). Accordingly, it is configured such that while an angle formed by the axis line O and a tangent line at the center of the two bottom large diameter edges 111a is 90°, angles formed by the axis line O and tangent lines at midpoints of the respective large diameter edges 111b to 111e change in phases from the bottom large diameter edge 111a to the outer peripheral large diameter edge 111e (in units of 22.5° in this embodiment).

The small diameter edge 112 is formed in an arc shape that internally contacts two arcs formed by extending the respective adjacent large diameter edges 111 (for example, the bottom large diameter edge 111a and the inclined large diameter edge 111b). This smoothly connects each large diameter edge 111 to the small diameter edge 112.

Figure 5:
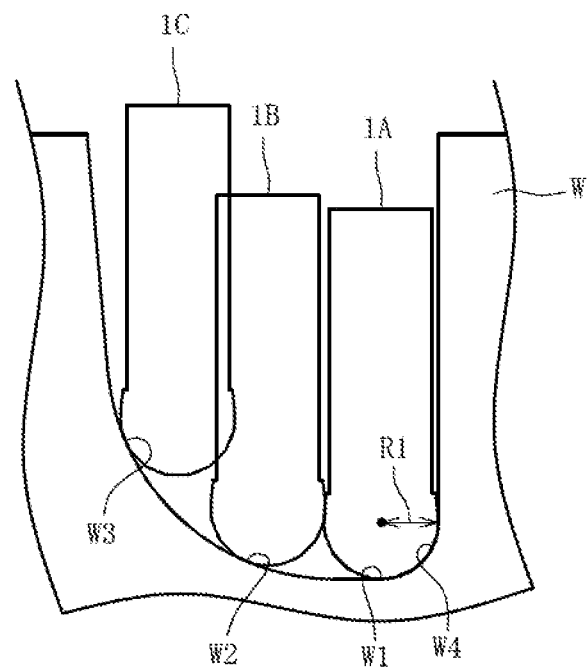
FIG. 5(a) is a schematic diagram illustrating a state of cutting the workpiece by three-axis machining with ball end mills.
FIG. 5(b) is a schematic diagram illustrating a state of cutting the workpiece by five-axis machining with ball end mills.
Figure 5:
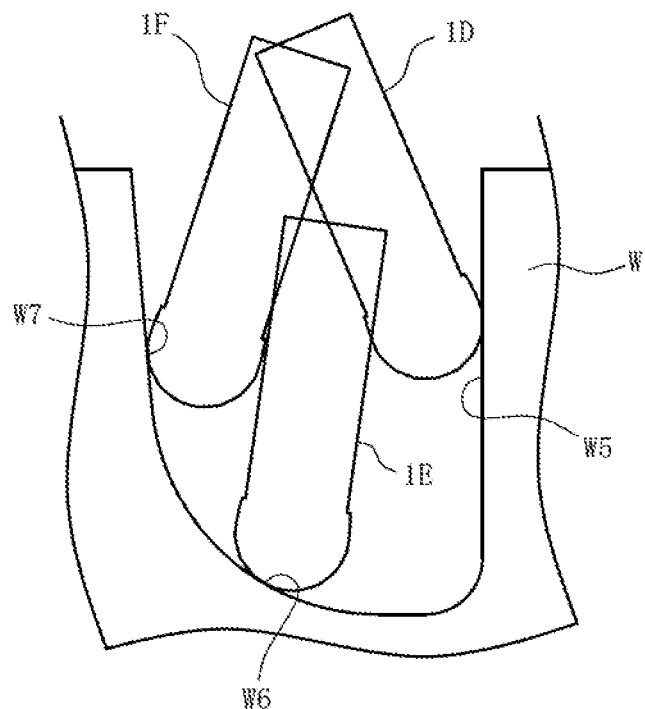

A cutting configuration by the first ball end cutting edge 110 and the second ball end cutting edge 120 thus configured will be described with reference to FIG. 3 to FIG. 5. FIG. 4(a) is a schematic diagram illustrating a state of cutting a workpiece W with the ball end mill of the present invention, and FIG. 4(b) is a schematic diagram illustrating a state of cutting the workpiece W with a ball end mill with a single R. FIG. 5(a) is a schematic diagram illustrating a state of cutting the workpiece W by three-axis machining with ball end mills 1A to 1C, and FIG. 5(b) is a schematic diagram illustrating a state of cutting the workpiece W by five-axis machining with ball end mills 1D to 1F.

As illustrated in FIG. 4(a), to cut a planar surface of the workpiece W (for example, finish machining of a bottom surface of a mold or the like), the cutting is performed with a predetermined notch depth with the two bottom large diameter edges 111a of the cutting insert 100 (see the two-dot chain line of FIG. 4(a)).

Next, the ball end mill 1 is moved by a predetermined pick feed P along a surface of the workpiece W for cutting (see the solid line part of FIG. 4(a)), the size of this pick feed P is appropriately set according to required surface roughness. In this case, since the bottom large diameter edge 111a is formed in the arc shape having the curvature radius larger than the ball radius R1 (see FIG. 3), cutting the planar surface of the workpiece W with the bottom large diameter edges 111a allows improving the surface roughness of the machined surface.

That is, as illustrated in FIG. 4(b), for example, when the cutting is performed with ball end cutting edges 510 formed in a single arc shape having the ball radius R1 (see FIG. 3) (hereinafter simply referred to as the "ball end cutting edge 510 with the single R") at the above-described pick feed P identical to that during the cutting with the bottom large diameter edges 111a, compared with the cutting with the bottom large diameter edges 111a, a cusp height h (cutting residue) increases and the surface roughness is likely to be decreased.

In other words, as in this embodiment, the configuration that includes the arc-shaped bottom large diameter edges 111a having the curvature radius larger than the ball radius R1 allows obtaining surface roughness equal to that during the cutting with the ball end cutting edges 510 with the single R even when the pick feed P is decreased. Further, although the illustration is omitted, since the bottom large diameter edge 111a is formed in the arc shape, when a curved surface of the workpiece W is cut, cutting along the curved surface can be performed with the bottom large diameter edges 111a. Accordingly, compared with a case of disposing linear cutting edges in the ball end cutting edge as in the conventional one, the surface roughness of the curved surface can be improved.

Accordingly, in the cutting of both of the planar surface and the curved surface of the workpiece W with the bottom large diameter edges 111a, the pick feed P can be increased, thereby ensuring improving machining efficiency in the cutting of both of the planar surface and the curved surface. Note that the operational effect brought by the bottom large diameter edges 111a is similarly provided by the other inclined large diameter edges 111b to 111d and outer peripheral large diameter edges 111e as well.

Here, the cutting by the ball end mill 1 (see FIG. 1) is performed by three-axis machining in which an inclination of the ball end mill 1 with respect to the workpiece W (relative angle) is fixed and five-axis machining in which the inclination with respect to the ball end mill 1 is variable. Cutting configurations of the first ball end cutting edge 110 and the second ball end cutting edge 120 in the three-axis machining and the five-axis machining will be further described. First, the three-axis machining will be described.

As illustrated in FIG. 5(a), there may be a case where the workpiece W is configured of a planar surface W1 and curved surfaces W2 to W4 having various angles. Therefore, to cut the workpiece W with one tool (without exchanging the tool), machining efficiency of each of the planar surface W1 and the curved surfaces W2 to W4 needs to be improved in a balanced manner.

In contrast to this, in this embodiment, the respective five large diameter edges 111 having the cutting width L2 (see FIG. 3) of the identical length are disposed from the distal ends to the outer peripheral ends of the first ball end cutting edge 110 and the second ball end cutting edge 120. Accordingly, when the planar surface W1 and the curved surfaces W2, W3 having the different angles (inclined angles with respect to the axis line O) are cut with each large diameter edge 111 (see the ball end mills 1A to 1C of FIG. 5(a)), the surface roughness of the machined surfaces by the cutting with each large diameter edge 111 can be easily uniformed.

In other words, by providing the plurality of large diameter edges 111, even when the relative angles of the ball end mills 1A to 1C to the workpiece W cannot be changed like three-axis machining, each large diameter edge 111 can easily run along the respective planar surface W1 and curved surfaces W2, W3, and therefore the machining efficiency in the planar surface W1 and the curved surfaces W2, W3 having the different angles can be improved in a balanced manner. Further, since the curvature radii of each large diameter edge 111 is configured to be identical, the surface roughness of the machined surfaces by the cutting with each large diameter edge 111 can be more easily uniformed. Accordingly, the machining efficiency in the planar surface W1 and the curved surfaces W2, W3 having the different angles can be improved in a balanced manner.

Additionally, the inclination of each large diameter edge 111 with respect to the axis line O gradually changes from the bottom large diameter edge 111a to the outer peripheral large diameter edges 111e. This also allows improving the machining efficiency in the planar surface W1 and the curved surfaces W2, W3 having the different angles in a more balanced manner in three-axis machining.

Here, there may be a case where, not the curved surfaces W2, W3 and the planar surface W1 having the curvature radii larger than that of each large diameter edge 111, but a curved surface W4 having a curvature radius smaller than that of each large diameter edge 111 (for example, the radius identical to the ball radius R1) is cut. In this case, since the curved surface W4 is simultaneously cut with each large diameter edge 111 (see the ball end mill 1A of FIG. 5(a)), to reduce cutting residue of the curved surface W4, the edge shapes of the first ball end cutting edge 110 and the second ball end cutting edge 120 are preferably close to the arc (single R).

Meanwhile, in this embodiment, since each large diameter edge 111 is formed at the curvature radii larger than the ball radius R1, compared with the ball end cutting edge having the single R, cutting residue during the cutting of the curved surface W4 is likely to occur, but this embodiment has the configuration that can reduce the cutting residue as much as possible.

That is, each large diameter edge 111 and each small diameter edge 112 are formed in the region within 105% or less of the ball radius R1 from the center C (see FIG. 3) of the first ball end cutting edge 110 (the second ball end cutting edge 120). Accordingly, even when the curvature radius of each large diameter edge 111 is larger than the ball radius R1, the rotation loci of each large diameter edge 111 and each small diameter edge 112 can be formed in the shapes close to the arc.

Additionally, when the imaginary circle V1 (see the enlarged part in FIG. 3) having the ball radius R1 is drawn with the center C of the first ball end cutting edge 110 and the second ball end cutting edge 120 as its center, it is configured such that the imaginary circle V1 contacts the rotation locus of each large diameter edge 111, and therefore this also allows the rotation locus of each large diameter edge 111 to form the shape close to the arc.

Further, each large diameter edge 111 is mutually smoothly connected with the respective small diameter edges 112 (see FIG. 3) formed in the arc shapes and having the curvature radii smaller than the ball radius R1. Therefore, compared with a case where the respective small diameter edges 112 are not formed, the rotation loci of each large diameter edge 111 and each small diameter edge 112 can be formed in the shape close to the arc.

By thus forming the rotation loci of each large diameter edge 111 and each small diameter edge 112 (the edge shapes of the first ball end cutting edge 110 and the second ball end cutting edge 120) in the shape close to the arc, even when the curved surface W4 having the radius smaller than the curvature radius of each large diameter edge 111 is cut, the cutting residue during the cutting can be reduced as much as possible. Accordingly, the decrease in the machining efficiency during the cutting of the curved surface W4 can be suppressed.

Further, since each large diameter edge 111 is mutually connected smoothly with the respective small diameter edges 112, even when the curved surface W4 of the workpiece W is simultaneously cut with each large diameter edge 111, chipping in the connecting part of each large diameter edge 111 can be suppressed. Furthermore, since the cutting width of each small diameter edge 112 is configured to be smaller than the cutting width of each large diameter edge 111, even when the small diameter edges 112 are disposed between each large diameter edge 111, the cutting width of each large diameter edge 111 can be ensured. This allows increasing the pick feed during the cutting of the planar surface and the curved surface with each large diameter edge 111, thereby ensuring improving machining efficiency in the cutting of both of the planar surface and the curved surface. Next, five-axis machining will be described.

As illustrated in FIG. 5(b), when the workpiece W is cut by five-axis machining, the relative angles of the ball end mills 1A to 1C to the workpiece W can be optionally set. Accordingly, compared with the cutting by three-axis machining, surface roughness of a planar surface W5 and curved surfaces W6, W7 having different angles can be improved.

That is, for example, when cutting is performed in a state where the respective small diameter edges 112 having the curvature radii smaller than that of each large diameter edge 111 are projected to the workpiece W side most, the surface roughness of the machined surfaces is likely to decrease. In contrast to this, in this embodiment, cutting with the ball end mills 1A to 1C inclined such that each large diameter edge 111 runs along the planar surface W5 and the curved surfaces W6, W7 having the different angles is possible. Thus, the surface roughness (machining efficiency) during the cutting of the planar surface W5 and the curved surfaces W6, W7 having the different angles can be improved.

Additionally, the five large diameter edges 111 are formed from the distal ends to the outer peripheral ends of the first ball end cutting edge 110 and the second ball end cutting edge 120 (see FIG. 3), and the angle of each large diameter edge 111 with respect to the axis line O gradually change from the bottom large diameter edge 111a to the outer peripheral large diameter edge 111e. Therefore, when each large diameter edge 111 runs along the planar surface W5 and the curved surfaces W6, W7 having the different angles, swing angles of the ball end mills 1D to 1F (amounts of adjustment of the relative angles to the workpiece W) can be decreased as much as possible. Accordingly, the machining efficiency when the planar surface W5 and the curved surfaces W6, W7 having the different angles are cut by five-axis machining can be improved.

Next, a modification of the cutting insert 100 will be described with reference to FIG. 6 and FIG. 7 with identical reference numerals given to parts identical to parts of the above-described cutting insert 100. First, with reference to FIG. 6, a first modification and a second modification of the cutting inserts 100 will be described.

FIG. 6(a) is a schematic diagram schematically illustrating edge shapes of a first ball end cutting edge 210 and a second ball end cutting edge 220 of a cutting insert 200 according to the first modification, and FIG. 6(b) is a schematic diagram schematically illustrating edge shapes of a first ball end cutting edge 310 and a second ball end cutting edge 320 of a cutting insert 300 according to the second modification.

Figure 6:
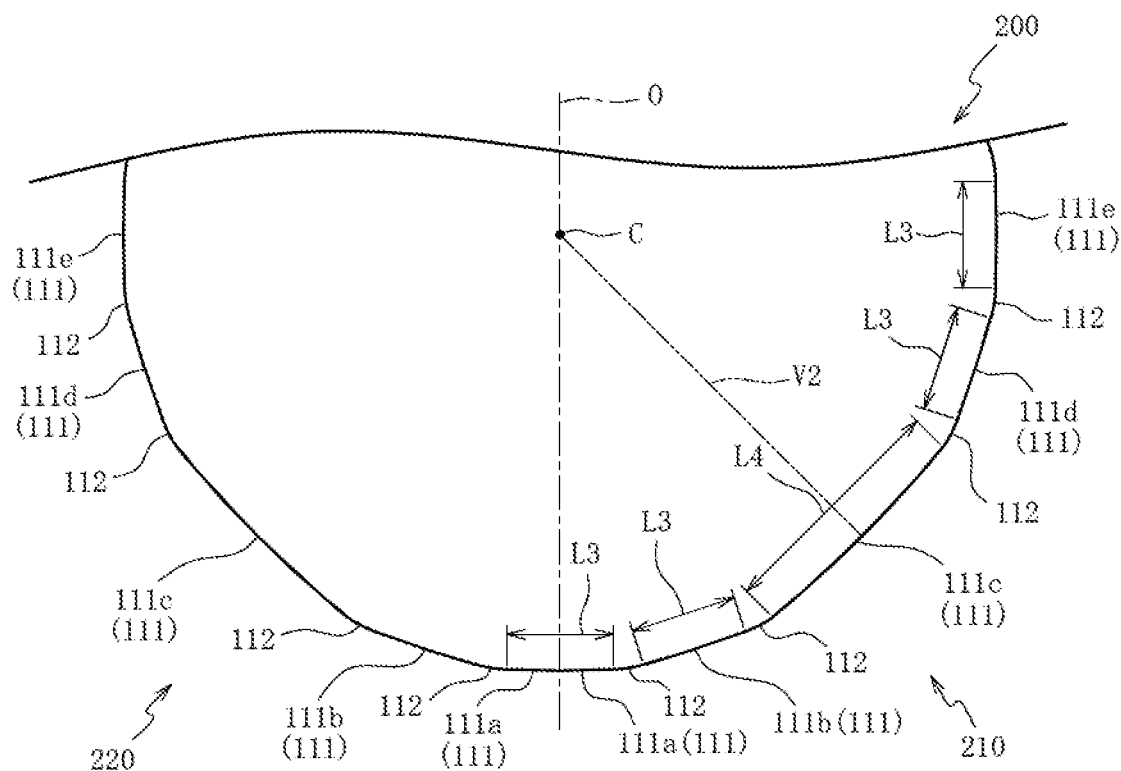
FIG. 6(a) is a schematic diagram schematically illustrating edge shapes of a first ball end cutting edge and a second ball end cutting edge of a cutting insert according to a first modification.
FIG. 6(b) is a schematic diagram schematically illustrating edge shapes of a first ball end cutting edge and a second ball end cutting edge of a cutting insert according to a second modification.
Figure 6:
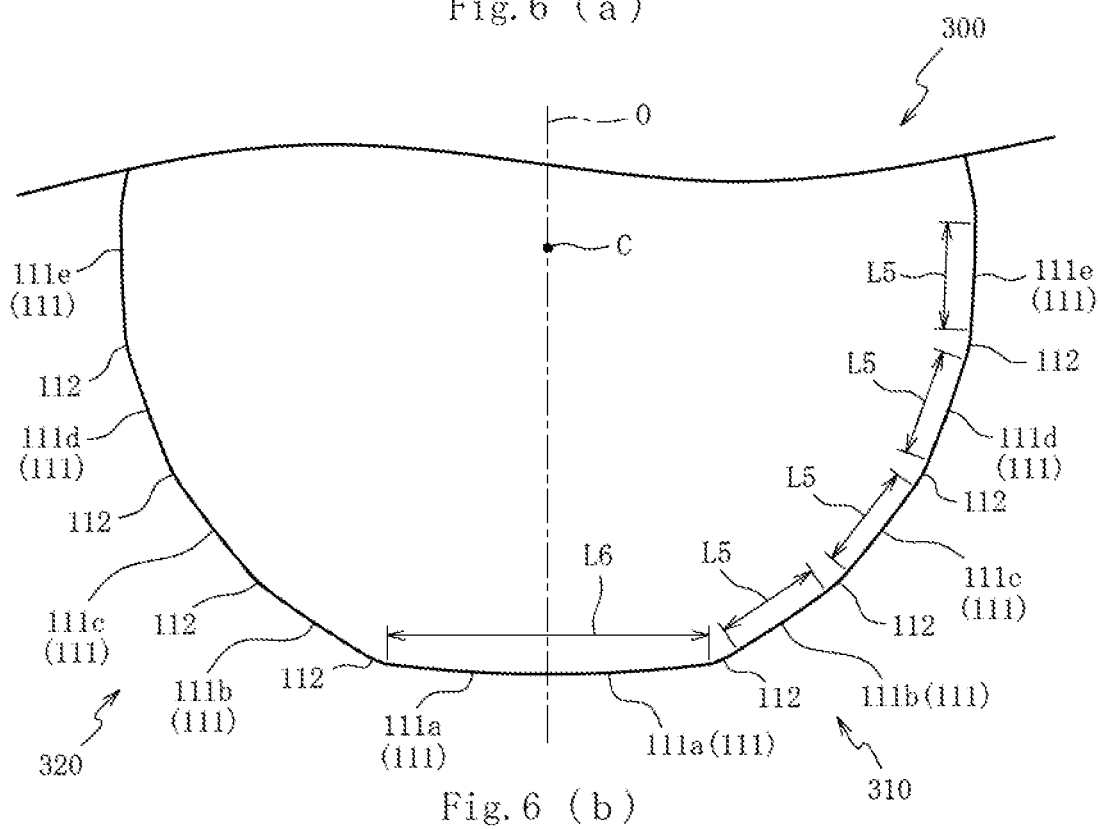

FIG. 6 is a diagram projecting the edge shapes (contour shapes) of the first ball end cutting edges 210, 310 and the second ball end cutting edges 220, 320 in the thickness direction and illustrates rotation loci of the first ball end cutting edges 210, 310 and the second ball end cutting edges 220, 320.

Except that the cutting width and the curvature radius of each large diameter edge 111 are different, the cutting inserts 200, 300 according to the first modification and the second modification have configurations substantially identical to that of the cutting insert 100 of the above-described embodiment. Therefore, a reference numerals identical to that of each large diameter edge 111 of the cutting insert 100 of the embodiment will be given to each large diameter edge 111 of the cutting inserts 200, 300 of the first modification and the second modification for description.

As illustrated in FIG. 6(a), each large diameter edge 111 of the cutting insert 200 according to the first modification is formed in an arc shape having a curvature radius larger than a ball radius (10 mm in this embodiment) of the first ball end cutting edge 210 and the second ball end cutting edge 220. Additionally, each small diameter edge 112 is formed in an arc shape having a curvature radius (3 mm in this embodiment) smaller than the ball radius of the first ball end cutting edge 210 and the second ball end cutting edge 220.

Note that, the ball radius is a length of a line segment perpendicularly extending from the axis line O to an outer peripheral end of the first ball end cutting edge 210 (the second ball end cutting edge 220), and an intersection point between the line segment and the axis line O becomes the center C of the first ball end cutting edge 210 and the second ball end cutting edge 220.

A cutting width L3 by the two bottom large diameter edges 111a of the first ball end cutting edge 210 and the second ball end cutting edge 220, the cutting width L3 by the outer peripheral large diameter edge 111e, and the cutting widths L3 of the inclined large diameter edges 111b, 111d adjacent to the bottom large diameter edge 111a and the outer peripheral large diameter edge 111e have the identical length (2.5 mm in this embodiment). The respective curvature radii (30 mm in this embodiment) of the bottom large diameter edge 111a, the outer peripheral large diameter edge 111e, and the inclined large diameter edges 111b, 111d are identical.

On the other hand, among the three inclined large diameter edges 111b to 111d, the inclined large diameter edge 111c positioned on an imaginary line V2, which passes through the center C of the first ball end cutting edge 210 and the second ball end cutting edge 220 and has an angle of 45° with respect to the axis line O (the inclined large diameter edge 111c having the rotation locus on the imaginary line V2) has a cutting width L4 (5.6 mm in this embodiment) and a curvature radius (40 mm in this embodiment) larger than those of the other large diameter edges 111a, 111b, 111d, 111e.

This allows especially improving the surface roughness (the machining efficiency) of the machined surface by the cutting with the inclined large diameter edges 111c when the machined surface of the workpiece inclined around 45° with respect to the axis line O is cut by three-axis machining. On the other hand, the machined surface of the workpiece inclined at an angle different from it is cut with the other large diameter edges 111a, 111b, 111d, 111e, thus ensuring improving the surface roughness (the machining efficiency) of the machined surfaces.

Here, when the cutting insert 200 is rotated, a peripheral velocity of the bottom large diameter edge 111a, which is formed at the position closest to the axis line O, becomes slow, and therefore the surface roughness of the machined surface is likely to comparatively decrease during the cutting with the bottom large diameter edge 111a. On the other hand, while the peripheral velocity of the outer peripheral large diameter edge 111e, which is formed at the position farthest from the axis line O, is comparatively fast, since a force in the direction perpendicular to the axis line O is likely to be applied to the ball end mill in the cutting with the outer peripheral large diameter edges 111e (the ball end mill is likely to bend), the surface roughness of the machined surface is likely to comparatively decrease during the cutting with the outer peripheral large diameter edges 111e.

That is, among each large diameter edge 111, the cutting with the inclined large diameter edges 111c, which are positioned on the imaginary lines V2 at the angles of 45° with respect to the axis line O, is preferred from the aspect of the peripheral velocity of the edges and the bending of the tool. In contrast to this, in this embodiment, the cutting width L4 and the curvature radius of the inclined large diameter edge 111c are configured to be the largest. Accordingly, the inclined large diameter edges 111c can be made to run along the planar surface and the curved surfaces having the different angles for cutting by five-axis machining, and therefore the surface roughness (the machining efficiency) of the machined surfaces can be especially effectively improved compared with the cutting with the other large diameter edges 111a, 111b, 111d, 111e.

Note that when an imaginary circle (not illustrated) having the ball radius with the center C of the first ball end cutting edge 210 and the second ball end cutting edge 220 as its center is drawn, while the imaginary circle internally contacts the other large diameter edges 111a, 111b, 111d, 111e excluding the inclined large diameter edge 111c, the inclined large diameter edge 111c is formed inside the imaginary circle. Thus, in the case where a part of each large diameter edge 111 does not contact the imaginary circle having the ball radius with the center C as its center, the edge shapes of the first ball end cutting edge 210 and the second ball end cutting edge 220 are likely to be shapes different from an arc.

In contrast to this, in the first modification, each large diameter edge 111 and each small diameter edge 112 are formed in a region 90% or more to 110% or less of the ball radius from the center C of the first ball end cutting edge 210 (the second ball end cutting edge 220). Accordingly, even when the cutting width L4 and the curvature radius of the inclined large diameter edge 111b are larger than the cutting widths L3 and the curvature radii of the other large diameter edges 111a, 111b, 111d, 111e, the edge shape of the first ball end cutting edge 210 (the second ball end cutting edge 220), that is, the rotation loci of each large diameter edge 111 and each small diameter edge 112 can be formed in a shape close to an arc. This allows suppressing the decrease in machining efficiency when the curved surface having the radius smaller than the curvature radius of each large diameter edge 111 is simultaneously cut with each large diameter edge 111.

As illustrated in FIG. 6(b), each large diameter edge 111 of the cutting insert 300 according to the second modification is formed in an arc shape having a curvature radius larger than the ball radius (10 mm in this embodiment) of the first ball end cutting edge 310 and the second ball end cutting edge 320. Each small diameter edge 112 is formed in an arc shape having a curvature radius (3 mm in this embodiment) smaller than the ball radius of the first ball end cutting edge 310 and the second ball end cutting edge 320.

Note that, the ball radius is a length of a line segment perpendicularly extending from the axis line O to an outer peripheral end of the first ball end cutting edge 310 (the second ball end cutting edge 320), and an intersection point between the line segment and the axis line O becomes the center C of the first ball end cutting edge 310 and the second ball end cutting edge 320.

Cutting widths L5 (2.5 mm in this embodiment) by the respective inclined large diameter edges 111b to 111d and the outer peripheral large diameter edge 111e each have an identical length. The respective inclined large diameter edges 111b to 111d and the outer peripheral large diameter edge 111e are each formed in an arc shape having the identical curvature radius (30 mm in this embodiment).

On the other hand, the two bottom large diameter edges 111a of the first ball end cutting edge 310 and the second ball end cutting edge 320 have cutting widths L6 (7.5 mm in this embodiment) and curvature radii (40 mm in this embodiment) larger than those of the other large diameter edges 111b to 111e.

This allows especially improving the surface roughness (the machining efficiency) of the machined surface by the cutting with the bottom large diameter edges 111a when the machined surface of the workpiece perpendicular to the axis line O is cut by three-axis machining. On the other hand, the machined surface of the workpiece inclined at an angle different from it is cut with the other large diameter edges 111b to 111e, thus ensuring improving the surface roughness (the machining efficiency) of the machined surfaces.

Note that when an imaginary circle (not illustrated) having the ball radius with the center C of the first ball end cutting edge 310 and the second ball end cutting edge 320 as its center is drawn, the imaginary circle internally contacts the two bottom large diameter edges 111a and the outer peripheral large diameter edge 111e, and the other inclined large diameter edges 111b to 111d are formed outside the imaginary circle. As described above, when a part of each large diameter edge 111 does not contact the imaginary circle having the ball radius, the edge shape formed by each large diameter edge 111 is likely to be a shape different from an arc.

In contrast to this, in the second modification as well, each large diameter edge 111 and each small diameter edge 112 are formed in a region 90% or more to 110% or less of the ball radius from the center C of the first ball end cutting edge 310 (the second ball end cutting edge 320). Accordingly, the edge shape of the first ball end cutting edge 310 (the second ball end cutting edge 320), that is, the rotation loci of each large diameter edge 111 and each small diameter edge 112 can be formed in shapes close to arcs. This allows suppressing the decrease in machining efficiency when the curved surface having the radius smaller than the curvature radius of each large diameter edge 111 is simultaneously cut with each large diameter edge 111.

Next, with reference to FIG. 7, a third modification of the cutting insert 100 will be described. FIG. 7 is a schematic diagram schematically illustrating edge shapes of a first ball end cutting edge 410 and a second ball end cutting edge 420 of a cutting insert 400 according to the third modification. FIG. 7 is a diagram projecting the edge shapes (contour shapes) of the first ball end cutting edge 410 and the second ball end cutting edge 420 in the thickness direction and illustrates rotation loci of the first ball end cutting edge 410 and the second ball end cutting edge 420.

Figure 7:
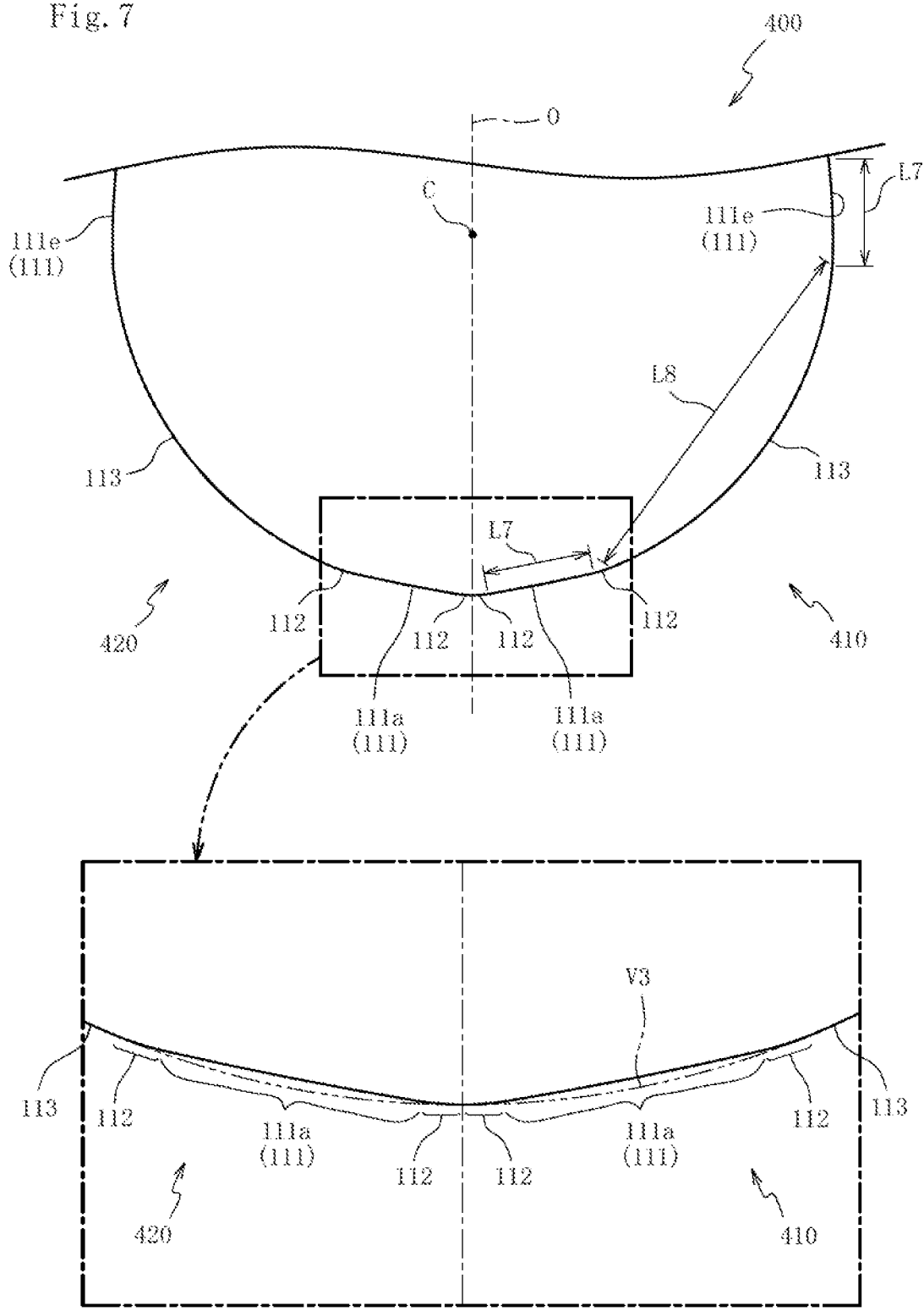
FIG. 7 is a schematic diagram schematically illustrating edge shapes of a first ball end cutting edge and a second ball end cutting edge of a cutting insert according to a third modification.

As illustrated in FIG. 7, each large diameter edge 111 of the cutting insert 400 according to the third modification is formed in an arc shape having a curvature radius larger than the ball radius (10 mm in this embodiment) of the first ball end cutting edge 410 and the second ball end cutting edge 420. Additionally, each small diameter edge 112 is formed in an arc shape having a curvature radius (3 mm in this embodiment) smaller than the ball radius of the first ball end cutting edge 410 and the second ball end cutting edge 420.

Note that, the ball radius is a length of a line segment perpendicularly extending from the axis line O to an outer peripheral end of the first ball end cutting edge 410 (the second ball end cutting edge 420), and an intersection point between the line segment and the axis line O becomes the center C of the first ball end cutting edge 410 and the second ball end cutting edge 420.

Between the bottom large diameter edge 111a and the outer peripheral large diameter edge 111e is connected with an intermediate diameter edge 113. The intermediate diameter edge 113 is formed in an arc shape having a curvature radius identical to the ball radii of the first ball end cutting edge 410 and the second ball end cutting edge 420. While an outer peripheral end side of the intermediate diameter edge 113 is directly connected to the outer peripheral large diameter edge 111e, the distal end side of the intermediate diameter edge 113 is connected to the bottom large diameter edge 111a via the small diameter edge 112.

The bottom large diameter edge 111a is formed to have a length not reaching the axis line O, and the bottom large diameter edge 111a of the first ball end cutting edge 410 and the bottom large diameter edge 111a of the second ball end cutting edge 420 are connected with the pair of small diameter edges 112 positioned on the axis line O. That is, the pair of small diameter edges 112 constitute cutting edges on the most distal end sides of the respective first ball end cutting edge 410 and second ball end cutting edge 420.

A cutting width L7 by the bottom large diameter edge 111a and the cutting width L7 by the outer peripheral large diameter edge 111e each have an identical length (3 mm in this embodiment). A curvature radius (20 mm in this embodiment) of the outer peripheral large diameter edge 111e is configured smaller than a curvature radius (50 mm in this embodiment) of the bottom large diameter edge 111a. On the other hand, a cutting width L8 (10 mm in this embodiment) of the intermediate diameter edge 113 is formed larger than that of each large diameter edges 111.

By thus disposing the intermediate diameter edge 113 having the curvature radius smaller than that of each large diameter edge 111 and configuring the cutting width L8 of the intermediate diameter edge 113 to be the largest, especially the machining efficiency of the curved surface having the curvature radius smaller than that of each large diameter edge 111 (that is, the curved surface having the curvature radius identical to the ball radius) can be improved.

Additionally, the five-axis machining using this cutting insert 400 cuts the curved surfaces and the planar surface having the curvature radii larger than that of the intermediate diameter edge 113 with each large diameter edge 111 and cuts the curved surface having the curvature radius smaller than that of each large diameter edge 111 with the intermediate diameter edges 113, and this allows improving the surface roughness (the machining efficiency) of the machined surfaces during the cutting of the curved surfaces having various curvature radii.

Here, in rough machining of the workpiece with the ball end cutting edge, for example, when there is an edge projecting outside of the ball radius, to suppress an excessive machining allowance, a machining locus needs to be operated with the projecting edge as a reference. Accordingly, a configuration in which a plurality of large diameter edges and small diameter edges project from the ball radius tends to make the operation of the machining locus complicated.

In contrast to this, in this embodiment, when an imaginary circle V3 (see the enlarged part in FIG. 7) having the ball radius is drawn with the center C of the first ball end cutting edge 410 and the second ball end cutting edge 420 as its center, while the intermediate diameter edges 113 are formed along the imaginary circle V3, the bottom large diameter edges 111a and the outer peripheral large diameter edges 111e are formed inside the imaginary circle V3. That is, each large diameter edge 111, each small diameter edge 112, and the intermediate diameter edges 113 do not project outside the imaginary circle V3 having the ball radius.

By thus disposing each large diameter edge 111, each small diameter edge 112, and the intermediate diameter edges 113 inside the imaginary circle V3 (predetermined reference circle), performing the rough machining with the machining locus using the shape of the ball end cutting edge having the ball radius as its reference allows reducing excessive machining allowance. In other words, rough machining can be performed with the machining locus referencing the shape of the ball end cutting edge having the ball radius, and therefore the operation of the machining locus can be easily performed.

On the other hand, while the bottom large diameter edge 111a and the outer peripheral large diameter edge 111e are formed inside the imaginary circle V3, in the third modification as well, each large diameter edge 111 and each small diameter edge 112 are formed in a region 95% or more of the ball radius from the center C of the first ball end cutting edge 410 (the second ball end cutting edge 420). Accordingly, the edge shape of the first ball end cutting edge 410 (the second ball end cutting edge 420), that is, the rotation loci of each large diameter edge 111 and each small diameter edge 112 can be formed in shapes close to arcs. This allows suppressing the decrease in machining efficiency when the curved surface having the radius (for example, the ball radius) smaller than the curvature radius of each large diameter edge 111 is simultaneously cut with each large diameter edge 111, the respective small diameter edges 112, and the intermediate diameter edge 113.

As described above, the present invention has been described based on the above-mentioned embodiments. It can be easily inferred that the present invention will not be limited to the embodiments described above by any means, but various modifications and improvements are possible without departing from the gist of the present invention. For example, the values of the cutting widths and the curvature radii of each large diameter edge 111, each small diameter edge 112, and the intermediate diameter edge 113 are examples and can be appropriately set.

While the case where the first ball end cutting edges 110, 210, 310, 410 and the second ball end cutting edges 120, 220, 320, 420 are formed in the cutting inserts 100, 200, 300, 400 removably configured in the ball end mill 1 has been described in the embodiments, the configurations are not limited to these. For example, ball end cutting edges equivalent to the first ball end cutting edges 110, 210, 310, 410 and the second ball end cutting edges 120, 220, 320, 420 may be disposed in a solid type ball end mill and a cutting edge brazed ball end mill.

While the case where the first ball end cutting edges 110, 210, 310, 410 and the second ball end cutting edges 120, 220, 320, 420 (two cutting edges) are formed in the cutting inserts 100, 200, 300, 400 has been described in the embodiments, the configuration is not limited to this. For example, one first ball end cutting edge 110, 210, 310, 410 (second ball end cutting edge 120, 220, 320, 420) may be formed in one cutting insert and a plurality of the cutting inserts may be mounted to the ball end mill 1. Alternatively, three or more ball end cutting edges equivalent to the first ball end cutting edge 110, 210, 310, 410 and the second ball end cutting edge 120, 220, 320, 420 may be formed in one cutting insert.

While the case where the five large diameter edges 111 are formed in the first ball end cutting edge 110, 210, 310 (second ball end cutting edge 120, 220, 320), that is, the case where the five large diameter edges 111 are formed in one ball end cutting edge has been described in the embodiments, the configuration is not limited to this. It is only necessary to form at least the two or more large diameter edges 111 in one ball end cutting edge like the first ball end cutting edge 410 (the second ball end cutting edge 420), but 5 or more to 16 or less of the large diameter edges 111 are preferably disposed in one ball end cutting edge.

That is, when the number of the large diameter edges 111 is less than 5, although the length of cut (cutting width) of each large diameter edge 111 can be formed long, the angle of the machined surface (the planar surface and the curved surfaces) that can be machined with each large diameter edge 111 in three-axis machining are restricted. Additionally, when the number of large diameter edges 111 exceeds 16, although the planar surface and the curved surface having a various angle can be cut with each large diameter edge 111 in three-axis machining, the length of cut (cutting width) of each large diameter edge 111 decreases, and therefore machining efficiency decreases when the cutting is performed with one large diameter edge 111.

In contrast to this, by disposing the five or more large diameter edges 111 in one ball end cutting edge, compared with the case of the number of the large diameter edges 111 of less than five, the planar surface and the curved surfaces having a various angle can be cut with each large diameter edge 111 in three-axis machining. Accordingly, even when cutting is performed by three-axis machining, the machining efficiency of the planar surface and the curved surfaces having the different angles can be improved in a more balanced manner. Additionally, disposing 16 or less of the large diameter edges 111 in one ball end cutting edge allows ensuring the cutting width of each large diameter edge 111 large, compared with the case of the number of large diameter edges 111 in excess of 16. This allows increasing the pick feed during the cutting of the planar surface and the curved surface with each large diameter edge 111, and therefore the machining efficiency can be improved in the cutting of both of the planar surface and the curved surfaces.

While the case where the cutting width (the curvature radii) of each large diameter edge 111 is identical in the first ball end cutting edge 110, 210, 310, 410 (the second ball end cutting edge 120, 220, 320, 420), the case where the cutting width (the curvature radius) of the inclined large diameter edge 111c is larger than those of the other large diameter edges 111a, 111b, 111d, 111e, and the case where the cutting width (the curvature radius) of the bottom large diameter edge 111a is larger than those of the other large diameter edges 111b to 111e have been described, the configurations are not limited to these. For example, the cutting widths and the curvature radii may differ in each large diameter edge 111, or among each large diameter edge 111, the cutting widths and the curvature radii of the two or more large diameter edges 111 may be configured larger (smaller) than those of the other large diameter edges 111.

Among each large diameter edge 111, the cutting width and the curvature radius of the outer peripheral large diameter edge 111e positioned on the most outer peripheral end side may be configured larger than those of the other large diameter edges 111a to 111d. This allows especially improving the surface roughness of the machined surfaces by the cutting with the outer peripheral large diameter edge 111e when the planar surface (for example, the wall surface of the workpiece) parallel to the axis line O is cut by three-axis machining.

That is, the cutting width and the curvature radius of each large diameter edge 111 only need to be appropriately set according to the workpiece to be cut, and the cutting width and the curvature radius of each large diameter edge 111 may be any value. However, it is preferred that each large diameter edge 111 and each small diameter edge 112 (intermediate diameter edge 113) are formed in a region at least 80% or more to 120% or less of the ball radius from the center C of the ball end cutting edge (lengths from the center C of the ball end cutting edge to each midpoint of each large diameter edge 111 and each small diameter edge 112 (intermediate diameter edge 113) become 80% or more to 120% or less of the ball radius). As the formation region is close to 100% of the ball radius, the edge shape formed by each large diameter edge 111 and each small diameter edge 112 (intermediate diameter edge 113) can be shapes close to the arc shapes.

Each of the large diameter edges 111 and the small diameter edges 112 (intermediate diameter edge 113) are more preferably formed in a region 100% or less of the ball radius from the center C of the ball end cutting edge. This allows performing rough machining with the machining locus using the shape of the ball end cutting edge having the ball radius as the reference, thereby ensuring easily performing the operation of the machining locus.

While the case where between each large diameter edge 111 and between the large diameter edge 111 and the intermediate diameter edge 113 are connected with the small diameter edge 112 has been described in the embodiments, the configuration is not limited to this. For example, a configuration in which the small diameter edges 112 are omitted and each large diameter edge 111 is directly connected or a configuration in which the large diameter edges 111 and the intermediate diameter edges 113 are directly connected may be employed.

REFERENCE SIGNS LIST

1: ball end mill
100, 200, 300, 400: cutting insert
110, 210, 310, 410: first ball end cutting edge (ball end cutting edge)
111a: bottom large diameter edge (large diameter edge)
111b, 111c, 111d: inclined large diameter edge (large diameter edge)
111e: outer peripheral large diameter edge (large diameter edge)
112: small diameter edge
113: intermediate diameter edge
120, 220, 320, 420: second ball end cutting edge (ball end cutting edge)
C: center of ball end cutting edge
L1, L2, L3, L4, L5, L6, L7: cutting width of large diameter edge
O: axis line
R1: ball radius
V1: imaginary circle
V2: imaginary line

The invention claimed is:

1. A ball end mill comprising
a ball end cutting edge on a distal end in an axis line direction, a rotation locus of the ball end cutting edge around the axis line being formed in an approximately hemispherical shape,
wherein the ball end cutting edge includes a large diameter edge, and the large diameter edge is formed in an arc shape having a curvature radius larger than a ball radius of the ball end cutting edge,
a plurality of the large diameter edges are formed in a region 80% or more to 120% or less of the ball radius from a center of the ball end cutting edge from a distal end to an outer peripheral end of the ball end cutting edge,
the plurality of large diameter edges each have an identical cutting width in a predetermined region from the distal end to the outer peripheral end side of the ball end cutting edge,
the plurality of large diameter edges each have the identical curvature radius, and
when an imaginary circle having the ball radius is drawn with the center of the ball end cutting edge as a center, the imaginary circle internally contacts respective rotation loci of the plurality of large diameter edges;
wherein the ball end cutting edge includes a plurality of small diameter edges, and the plurality of small diameter edges connect between the large diameter edges and have arc shapes having curvature radii smaller than the ball radius, and
the large diameter edges have cutting widths larger than cutting widths of the small diameter edges.

2. A cutting insert mounted to the distal end of the ball end mill according to claim 1,
wherein the ball end cutting edge is formed.

3. A cutting insert mounted to the distal end of the ball end mill according to claim 1,
wherein the ball end cutting edge is formed.

4. A cutting insert mounted to the distal end of the ball end mill according to claim 1,
wherein the ball end cutting edge is formed.

* * * * *